United States Patent [19]

Reiser et al.

[11] Patent Number: 4,526,845
[45] Date of Patent: * Jul. 2, 1985

[54] MOLTEN CARBONATE FUEL CELL INTEGRAL MATRIX TAPE AND BUBBLE BARRIER

[75] Inventors: Carl A. Reiser; Donald L. Maricle, both of Glastonbury, Conn.

[73] Assignee: United Technologies Corporation, Hartford, Conn.

[ * ] Notice: The portion of the term of this patent subsequent to Oct. 25, 2000 has been disclaimed.

[21] Appl. No.: 516,833

[22] Filed: Jul. 25, 1983

Related U.S. Application Data

[63] Continuation-in-part of Ser. No. 307,338, Sep. 30, 1981, Pat. No. 4,411,968.

[51] Int. Cl.$^3$ .............................................. H01M 4/86
[52] U.S. Cl. ...................................... 429/41; 429/44; 429/46; 427/115
[58] Field of Search ...................... 429/41, 44, 33, 46; 427/115; 156/62.2; 228/903

[56] References Cited

U.S. PATENT DOCUMENTS 4,411,968 10/1983 Reiser et al. ...................... 429/46 X Primary Examiner—Charles F. LeFevour
Attorney, Agent, or Firm—Harry J. Gwinnell

[57] ABSTRACT

A molten carbonate fuel cell matrix material is described made up of a matrix tape portion and a bubble barrier portion. The matrix tape portion comprises particles inert to molten carbonate electrolyte, ceramic particles and a polymeric binder, the matrix tape being flexible, pliable and having rubber-like compliance at room temperature. The bubble barrier is a solid material having fine porosity up to about 50% by volume, optionally being bonded to the matrix tape. In operation in a fuel cell, the polymer binder burns off leaving the matrix and bubble barrier providing superior sealing, stability and performance properties to the fuel cell stack.

16 Claims, 1 Drawing Figure

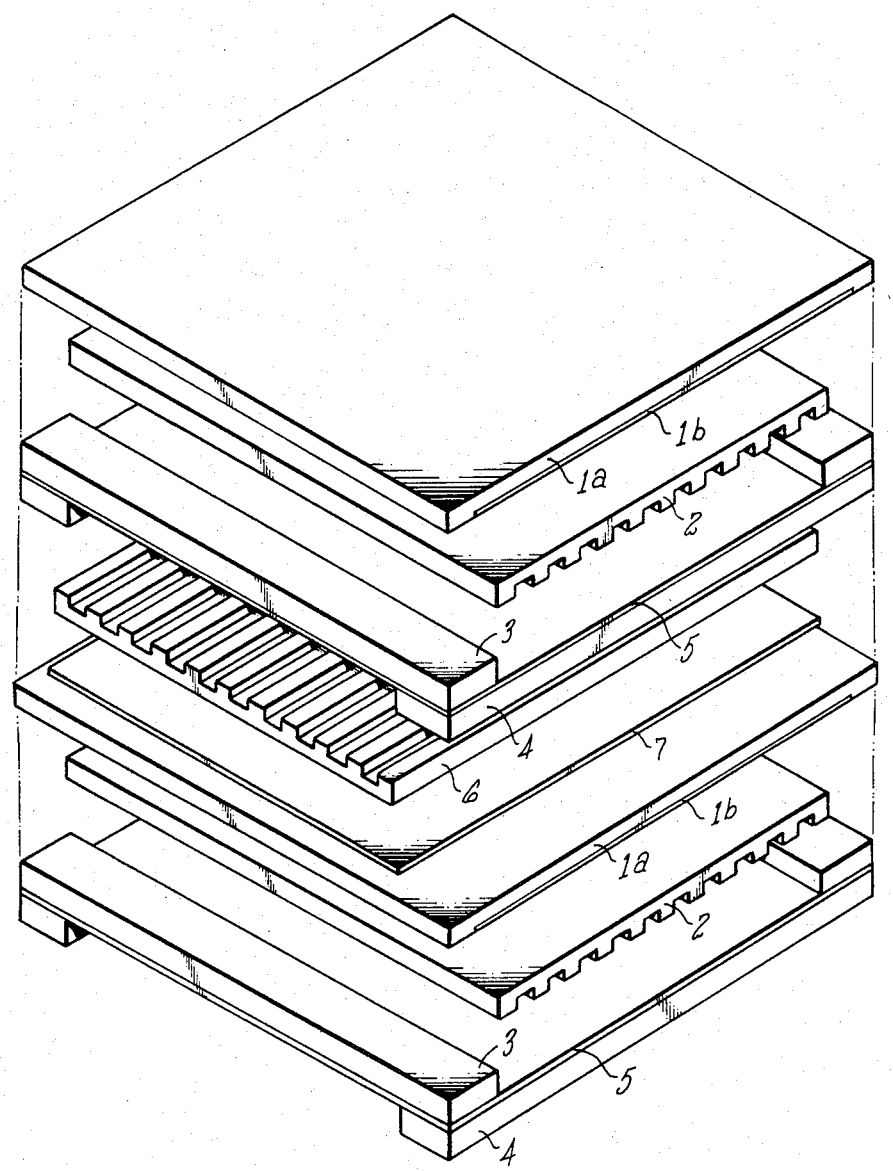

MOLTEN CARBONATE FUEL CELL INTEGRAL MATRIX TAPE AND BUBBLE BARRIER

This application is a continuation-in-part of co-pending U.S. patent application Ser. No. 307,338 filed Sept. 30, 1981 now U.S. Pat. No. 4,411,968.

DESCRIPTION

1. Technical Field

The field of art to which this invention pertains is molten carbonate fuel cells and particularly matrix components for such fuel cells.

2. Background Art

Molten carbonate fuel cells are well known in the art and are described, for example, in U.S. Pat. Nos. 4,009,321 and 4,079,171. The electrolyte in this type of cell is solid at room temperature and is a molten liquid at operating temperatures which generally range between 500° C. and 750° C. Some well known electrolytes of this type are the alkali metal carbonate compositions such as ternary lithium-potassium-sodium carbonate compositions and binary lithium-potassium, lithium-sodium, or potassium-sodium carbonate compositions. The electrolyte is disposed within a substantially inert matrix sandwiched between an anode and a cathode electrode. In addition to having structural integrity, the matrix, in combination with the electrolyte, must provide complete separation of the fuel and oxidant gases disposed on opposite sides thereof. The electrolyte and matrix combination is often referred to as an electrolyte tile. The matrix is usually made from submicron ceramic particles which are compatible with the fuel cell environment. For example, lithium aluminate is substantially inert to the ternary and binary carbonate compositions mentioned above, and may be used as the matrix material in cells incorporating those types of electrolytes.

Typically, such tiles are produced by compression molding the inert material in admixture with the alkali metal carbonates. This method of producing the matrix structure suffers from many disadvantages. Compression molding is a relatively expensive forming method requiring relatively large amounts of time, energy and capital investment. The resultant molded tile is a relatively thick, fragile ceramic sheet. Accordingly, it is subject to cracking, and great care must be taken in the design of the fuel cell to provide a flat surface for such sheet to insure minimal flexural and compressive forces on the tile until heated above its melt point.

The poor handleability and critical tolerance requirements dictated by the use of this type of a matrix structure make scale-up to commercial sizes and quantities unattractive. In addition, a life-limiting, functional problem exists with the compression molded tiles of this type. As the cell runs, electrolyte is consumed by corrosive reactions, vaporization, and surface migration. In a typical tile cell, the electrolyte is withdrawn from the larger pores of the matrix. The lithium aluminate cannot be sufficiently close-packed in a tile to achieve a small, uniform pore size at operating temperature by compression molding. Therefore, electrolyte withdrawn from the tile results in contraction of the two-phase structure (matrix and electrolyte), subsequently resulting in the formation of gas pockets which contribute to gas crossover and high internal resistance.

Another problem encountered with molten carbonate fuel cell matrix material results from the thermal cycling which fuel cells undergo, for example, in the course of routine maintenance. Temperature cycles from the 1200° F.–1400° F. (649° C.–760° C.) molten carbonate fuel cells operating temperature down to room temperature are not uncommon. In the course of such thermal cycling, cracks can develop in the tile material, especially in the seal area further contributing to gas crossover.

Accordingly, what is needed in this art is a matrix material which is not critically fragile, and can withstand flexural and compressive forces during molten carbonate fuel cell assembly and operation.

DISCLOSURE OF INVENTION

The present invention is directed to a composite matrix material for a molten carbonate fuel cell comprising a matrix tape portion and a bubble barrier portion. The matrix tape portion is a sheet made up of a mixture of ceramic particles, particles inert to the molten carbonate environment and an organic polymer binder which burns off or volatilizes under fuel cell operating conditions. The bubble barrier portion is a fine pore ion permeable sheet of material, gas permeable in association with the electrolyte at molten carbonate fuel cell operating conditions which is bonded to the matrix tape. The bubble barrier portion has a porosity of up to about 50% by volume resulting in lower internal resistance and improved cell performance.

Another aspect of the invention comprises a molten carbonate fuel cell incorporating such matrix material with improved sealing, stability and performance properties.

The foregoing, and other features and advantages of the present invention, will become more apparent from the following description and accompanying drawing.

BRIEF DESCRIPTION OF THE DRAWING

The FIGURE shows a molten carbonate fuel cell according to the present invention.

BEST MODE FOR CARRYING OUT THE INVENTION

In the tape portion of the composite matrix according to the present invention, there are preferably three components in the tapes produced according to the present invention. The first component is an inert particle preferably less than about 1 micron in size. This produces a fine pore size (e.g. about 0.15 to about 0.3 micron average pore size) in the ultimate matrix to insure electrolyte retention. Gamma lithium alunimate is the preferred inert material, however, other material inert to the molten carbonate environment such as ceria, strontium titanate, strontium zirconate, etc. may be used.

The second component of the tape according to the present invention is corrosion resistant ceramic particulate material having an average size range greater than about 25 microns and preferably greater than about 50 microns (e.g. 50–150 microns) in diameter. The function of this component is primarily crack attenuation. It can be made of the same material as the inert particles above, or a more reactive material such as alumina which, because of the larger particle size has less surface area and, therefore, less reactivity toward the molten carbonate electrolyte. This allows use of ceramic materials not generally considered compatible with a molten carbonate system. Note commonly assigned U.S. patent application Ser. No. 158,019, filed June 9, 1980, the disclosure of which is incorporated by reference.

The third component is the temporary plastic binder. This binder provides handleability, flexibility and conformability to the tape, three key structural properties. While any polymer which decomposes at temperatures lower than the molten carbonate fuel cell operating temperatures can be used, polyvinyl butyral (Monsanto Butvar B-98) is preferred. Various plasticizers and other modifiers such as flow control agents can be added to the polymer for application purposes.

The components are mixed together with an organic solvent and applied to a mold surface treated with a release agent. After drying, the thus formed tape is removed and is ready for assembly into the molten carbonate fuel cell. The amounts of the materials may vary, but are preferably used in a range of about 40% to about 45% by volume of the inert submicron particles, about 5% to about 30% and preferably about 15% by volume of the larger, crack attenuating ceramic particles with the balance being the plastic binder material. The materials are preferably mixed in a ball mill with organic solvents such as chlorinated hydrocarbons and alcohol.

The coatings can be applied to the mold surface by any method such as brushing, spraying, etc. although the use of conventional curtain coaters and doctor blades is preferred. Note "Doctor-Blade Process" by J. C. Williams which teaches a method of formulating electronic ceramic tapes through the use of a doctor-blade process (*Treatise On Materials Science and Technology*, Vol. 9, Ceramic Fabrication Processes, Franklin F. Y. Wang, ed.).

In the coating operation, a glass mold surface is preferred, and while a variety of mold release agents such as Teflon ® (duPont De Nemours & Co., Inc.) and beeswax have been used, beeswax has been found to be easy to apply and long-lasting during a plurality of molding applications. The beeswax can be applied in solution in perchloroethylene with a clean cloth. Master Sheet Wax (the Kindt-Collins Co., Cleveland, Ohio) has been found to be particularly suitable for this purpose. It is particularly desirable to apply several layers of the matrix composite with drying between each application before removal from the mold surface.

Chlorinated hydrocarbons and alcohols have been found to be the preferred organic solvents for proper drying and flow control of the matrix tape material during casting. Alcohols such as ethanol and butanol mixed with chlorinated hydrocarbons such as perchloroethylene have been found to provide suitable flow properties to the slurry. A slurry viscosity in the range of 800–1200 cps is preferred for casting layers, either by doctor-blade or curtain coater. Other materials are added to aid mixing, casting, and final tape properties. A deflocculant such as crude menhaden fish-oil aids in dispersing the ceramic particles. An antifoaming agent like Dow Antifoam-A aids in the escape of trapped gas bubbles during drying. Plasticizers like Monsanto Santicizer #8 prevent embrittlement of the dried tape. The fish-oil also contributes to flexibility.

Entrapment of gas-bubbles in the tape requires their removal before drying. To aid this, drying must be retarded by use of solvents with lower vapor pressure, like butanol, or more effectively, by holding the freshlycast tape in an atmosphere saturated with solvent vapors. Typically, a 15 minute delay before drying will allow bubbles to escape. The use of an antifoam agent aids the breaking and release of the bubbles. If the solvent vapor treatment is utilized to remove entrapped gas bubbles before drying, any of the above-cited chlorinated hydrocarbon or alcohol solvents can be used, although the use of an azeotropic mixture of perchloroethylene and ethanol is preferred. Treatment time should be sufficient to remove the bubbles; in most instances, times of at least 5 minutes being required.

While any metal stable at the anode potential can be used as the bubble barrier sheet according to the present invention, nickel and copper and their alloys are particularly preferred. The metal bubble barrier sheet is formed by conventional metal forming methods such as powder sintering. Depending upon the design considerations of the fuel cell the sheets are to be used in, they can be made in any desired size, but preferably about 1 square foot to about 9 square feet in size. The metal bubble barrier sheet according to the present invention is preferably formed so as to have the maximum volume porosity while maintaining sufficient structural strength to be handled and arranged in the fuel cell and to maintain structural integrity during fuel cell operation. While porosities up to about 50% (e.g. about 25 to about 50%) by volume are typically used about 40% by volume is preferred with a mean pore size of about 3 microns or less. By utilizing these higher porosities lower internal resistance is produced in the cell resulting in improved cell performance.

Although it is preferred to use an anode stable metal (such as nickel) in conjunction with the matrix tape, a cathode stable metal could also be used, such as a stainless steel or a nickel alloy such as Hastalloy ® (Cabot Corporation) and the fuel cell constructed with the fine pore plate placed against the cathode. A third alternative is to fabricate the fine pore of a ceramic sintered material and associate it with the matrix tape, in which case it could be placed in contact with the anode or cathode. Furthermore, a combination could be used including an anode stable metal on one side of the matrix tape and a cathode stable metal on the other side, or either of the above in association with the ceramic sinter.

Any bonding agents which are compatible with the bubble barrier and matrix tape in this environment can be used to secure the two together. However, it is preferred simply to hot press the matrix tape to the bubble barrier with the organic polymeric binder of the tape serving as the adhesive.

Furthermore, while it is preferred for handling and operational purposes to bond the fine pore sheet to the matrix tape, it is not necessary to do so. For example, the two could be laid independently into the fuel cell, although better alignment can be ensured if they are bonded. And while the matrix tape is preferably oversized by at least 0.2 in. (0.5 cm) (preferably 0.2 in. to 0.5 in., 0.5 cm to 1.3 cm) as compared to the fine pore sheet, the two may also be coextensive.

Key advantages that the integral matrix tape and bubble barrier provide in the molten carbonate fuel cell are a back-up bubble barrier to prevent gas crossover if the ceramic matrix cracks during thermal cycling due to differences in expansion coefficient between the electrolyte filled ceramic matrix and structural metal of the fuel cell; since the anode and anode rails (note 3 in the FIGURE) are not gap-free, i.e. don't fit together perfectly, there is potential for matrix material to extrude into the cracks, causing sights for gas crossover through the matrix which is also prevented by the integral matrix tape and bubble barrier of the present invention.

In operation, based on the high temperatures involved in the operation of a molten carbonate fuel cell, the fine pore sheet of the matrix-sheet composite will bond itself to the metal of the anode and the seal material. This will improve the sealing of the fuel cell, especially during thermal cycling.

In tests run on molten carbonate fuel cells containing matrix-fine pore composites of the present invention, testing for up to 3000 hours showed no measurable increase in internal resistance or pressure drop across the cell utilizing fine pore sheets according to the present invention. Furthermore, there was no reactive gas crossover. And in thermal cycle tests between room temperature and 1200° F.–1400° F. (649° C.–760° C.) up to 8 thermal cycles were performed without any evidence of matrix cracking or gas crossover.

Surprisingly, not only does the fine pore sheet according to the present invention provide added stability and ease of handling to the matrix tape and matrix in fuel cell operation, but it does so without any measurable loss of performance properties such as internal resistance or other anode polarization in the fuel cell. Such result was quite unexpected.

Another advantage of the matrix tape according to the present invention as compared with the prior matrices is its pliability and compliance which, when placed between the electrodes in a molten carbonate fuel cell, allows it to conform to the irregularities of such surfaces producing more intimate contact, thus eliminating spaces that might otherwise interfere with the required ion transfer.

After the matrix tape is produced, electrolyte is preloaded into the anode, which has sufficient pore volume to enable it to contain enough electrolyte for the life of the cell (e.g. 40,000 hours) including enough electrolyte to fill the matrix. Such anodes are generally produced to contain about 50% to about 70% by volume porosity (preferably about 50% to about 55%) with about 30% to about 95% of that porosity electrolyte filled (preferably about 95%). The cell is heated up gradually to decompose and strip the plastic binder prior to electrolyte melting, allowing the electrolyte to wick out of the anode and into the matrix, substantially filling the pores of the matrix and bubble barrier. Cell seals and cathodes may also be provided with electrolyte from this same anode source.

EXAMPLE 788 grams of perchloroethylene, 260 grams of secondary isobutanol, and 36 grams of Dow-Corning Antifoam-A were mixed together with 1200 grams of calcined (4 hours at 1300° F., 704° C.) jet-milled $\gamma$ LiAlO$_2$, and ball-milled with alumina balls for 24 hours to thoroughly disperse the LiAlO$_2$.150 grams of Monsanto Santicizer #8 (N-ethylortho and para-toluenesulfonamide), 750 grams of denaturedethanol, and 275 grams of Monsanto Butvar B-98 (polyvinyl butyral) were then added, and ball milling was continued for 48 hours. The alumina milling balls were then removed, and 60 grams of crude menhaden fish-oil and 632 grams of 120 grit Alundum-38 (Al$_2$O$_3$) were added. Everything was then rolled without balls in the ball-mill to mix the ingredients without further grinding. The mill was then rotated slowly enough (1 to 2 rpm) to allow the escape of most trapped air bubbles without allowing the alumina to settle out. This solution was applied with a doctor-blade to glass sheets treated with a beeswax mold release agent. Coatings 9–12 mils thick were applied and allowed to air dry for 5–15 minutes to a thickness of about 5 to 6 mils. This process was repeated until coatings 12–25 mils thick were obtained. The final dried tape was easily removable from the mold surface and had a compliant consistency. When measured on a Shore A Durometer a reading of 94 was typically seen.

A mixture of about 0.5% to about 10% by weight chromium powder (and preferably about 2% by weight) is added to a balance of nickel powder (average diameter 1 to 5 mils). The mixed powder is spread on a ceramic carrier plate and sintered under 10% hydrogen balance nitrogen atmosphere at 1600° F.–2000° F. (871° C.–1093° C.). Following this, the sheet is conventionally cold rolled to a thickness of about 1 mil to about 20 mils with about 3 to about 5 mils being preferred and the sheet is then annealed at 1500° F. (816° C.). This is the point at which the ultimate volume porosity is determined. The greater the reduction in thickness during this rolling step, the lower the porosity. After formation of the tape and the metal, the sheets are typically simply laid in place one atop the other or they can be hot pressed together at about 200° F. (93° C.) to about 400° F. (204° C.) (275° F., 135° C. preferred) at pressures of about 500–2000 psi (3.4–13.8 MPa). Preferably the tape is about 15 mils thick and the fine pore sheet about 5 mils thick for an overall composite thickness of approximately 20 mils, although thickness up to twice this size can be used.

A ten-cell molten carbonate fuel cell stack of one square foot sheets was next assembled by placing matrix tapes between porous nickel anodes prefilled with electrolyte to approximately 95% of their porosity, and porous nickel cathodes (nickel oxide was also used), with separator plates between cells and heating according to the following schedule. It should be notes that while this example is described in terms of a ten-cell stack electrode-matrix assembly, an entire fuel cell stack can consist of approximately 500 of such electrode magrix assemblies which can be heat treated according to this process. The ten-cell stack of the above described cells was heated from room temperature up to 205° C. in an air environment with a temperature increase of 40° C. per hour. Once a temperature of 205° C. is attained, the stack was held there for 6 hours. The temperature of the stack was next raised to 315° C. in increments of 40° C. per hour and held there for 6 hours. This removes all solvent from the tape and volatilization of the polymer begins. The temperature of the stack was next raised again at 40° C. per hour to 470° C. and held there for 2 hours. Complete pyrolization and volatilization of the polymer now occurs. Following this, reducing gas was introduced into the stack and the temperature raised above the melt point of the electrolyte (about 490° C.) at the rate of 40° C. per hour until a stack operating temperature of approximately 650° C. was reached.

While the invention has primarily been described in terms of particular inert particles, ceramic particles, polymer binders, solvents, bubble barrier layers and release agents, it would, of course, be within the purview of one skilled in this art to use any materials which are compatible with molten carbonate at fuel cell operating conditions.

The composite matrix material is indicated in the FIGURE as 1, where 1$a$ is the matrix tape portion and 1$b$ the fine pore bubble barrier. The anode 2 rests against the bubble barrier 1$b$. Rails 3 and 4 provide a gas sealing function to the edges of the cell to further separate the fuel gas from the oxidant gas. Separator plates 5, in addition to also separating the gases, function to pass the current through the stack. The cathode is also shown as 6 including a cathode catalyst layer 7.

Although this invention has been shown and described with respect to detailed embodiments thereof, it will be understood by those skilled in the art that various changes in form and detail thereof may be made without departing from the spirit and scope of the claimed invention.

We claim:

1. A matrix material for a molten carbonate fuel cell comprising a fine pore, gas permeable, anode stable metal layer having about 40% to about 50% by volume porosity bonded to a matrix tape, the matrix tape comprising a mixture of particles inert to molten carbonate electrolyte having a particle size less than about 1 micron, ceramic particles having a particle size greater than about 25 microns, and an organic polymeric binder material, the binder material being present in an amount at least about 25% by volume, the matrix tape being flexible, pliable, and compliant at room temperature.

2. The matrix of claim 1 wherein the inert particles are present in about 40% to about 45% by volume and the ceramic particles are present in an amount at least about 15% by volume.

3. The matrix of claim 1 wherein the polymer is polyvinyl butyral.

4. The matrix of claim 1 wherein the inert material is lithium aluminate.

5. The matrix of claim 1 wherein the ceramic particles are alumina.

6. The matrix of claim 1 wherein the metal layer is about 3 mils to about 5 mils thick and the matrix tape is about 10 mils to about 15 mils thick.

7. The matrix of claim 1 wherein the metal layer is nickel containing about 2% to about 10% by weight chromium.

8. The matrix of claim 1 wherein the metal layer has about 40% by volume porosity.

9. A molten carbonate fuel cell containing an anode section, a cathode section, a matrix and electrolyte, wherein the improvement comprises as the matrix a fine pore, gas permeable, anode stable metal layer having about 40% to about 50% by volume porosity bonded to a matrix tape, the matrix tape comprising a mixture of particles inert to molten carbonate electrolyte having a particle size less than about 1 micron, ceramic particles having a particle size greater than about 25 microns, and an organic polymeric binder material, the binder material being present in an amount at least about 25% by volume, the matrix tape being flexible, pliable and compliant at room temperature.

10. The molten carbonate fuel cell of claim 9 wherein the inert particles are present in about 40% to about 45% by volume and the ceramic particles are present in an amount at least about 15% by volume.

11. The molten carbonate fuel cell of claim 9 wherein the polymer is polyvinyl butyral.

12. The molten carbonate fuel cell of claim 9 wherein the inert material is lithium aluminate.

13. The molten carbonate fuel cell of claim 9 wherein the particles are alumina.

14. The molten carbonate fuel cell of claim 9 wherein the metal layer is about 3 mils to about 5 mils thick and the matrix tape is about 10 mils to about 15 mils thick.

15. The molten carbonate fuel cell of claim 9 wherein the metal layer is nickel containing about 2% to about 10% by weight chromium.

16. The molten carbonate fuel cell of claim 9 wherein the metal layer has about 40% by volume porosity.

* * * * *